May 6, 1969 W. A. REICH 3,442,407
MEAT HANDLING HEAD FOR HAND TRUCKS
Filed March 6, 1967

INVENTOR
Walter A. Reich
BY
ATTORNEYS

United States Patent Office 3,442,407
Patented May 6, 1969

3,442,407
MEAT HANDLING HEAD FOR HAND TRUCKS
Walter A. Reich, Independence, Mo., assignor to A. Reich & Sons, Inc., Kansas City, Mo., a corporation of Missouri
Filed Mar. 6, 1967, Ser. No. 620,687
Int. Cl. B62b 1/06; B60p 1/64
U.S. Cl. 214—383                10 Claims

ABSTRACT OF THE DISCLOSURE

A meat handling head for use with a hand truck having an elevator to adapt the truck for handling meat carcasses such as quarters of beef and the like. The head includes a bracket mounting a pair of hooks thereon. One of the hooks is particularly adapted for handling hindquarters of beef and is mounted for movement on the bracket from a retracted position to a position for hooking engagement with the hindquarter. The other hook is particularly adapted for handling forequarters and is mounted on the bracket for swinging in a pair of mutually lateral directions so that the hook may be moved from a retracted position and into a position for positively engaging and hooking the ribs of the forequarter.

---

This invention relates to meat-handling apparatus and particularly relates to a meat-handling head for use with hand trucks and the like.

Meat carcasses and the like, and particularly quarters of beef, are stored, especially during curing thereof, by hanging the same from overhead hooks in a room having a controlled temperature environment. Such meat carcasses often weight several hundred pounds but must be handled rapidly and efficiently to prevent damage of the same and hold handling expenses to a minimum. Beef forequarters are conventionally supported and handled with a hook inserted under the ribs thereof. On the other hand, beef hindquarters are conventionally processed to provide an opening or gam hole for receiving a hook which engages a large tendon.

For maximum operational efficiency, it is desirable that a single man be capable of handling an entire portion of a meat carcass such as a beef quarter or the like, by himself. Toward that end, hand trucks or the like having elevators thereon have been utilized to assist the workman in handling such carcasses or portions thereof. These hand trucks may take the form of the hand truck illustrated in my Patent No. 3,141,564, entitled "Hand Truck" which issued on July 21, 1964, and which is assigned to the assignee of the instant invention. This patent is specifically incorporated herein as a reference.

While hand trucks as illustrated in my above referenced patent have assisted in the handling of meat carcasses and portions thereof, it was necessary for the operator thereof to manipulate the hand truck itself into a position where, upon operation of the elevator, the meat carcass could be lifted from its supporting hook and thereafter transported to a different location.

It is, therefore, the primary object of the instant invention to provide a novel meat-handling hook means for use with a hand truck or the like having an elevator wherein the hook means is mounted on the elevator and is shiftable relative thereto into a position for hooking engagement with a quarter of beef or the like so that the latter may be lifted by the elevator without substantial lateral manipulation of the entire hand truck.

Furthermore, it has been found that beef hindquarters and forequarters must generally be handled in a different manner which has, in the past, necessitated the use of separate handling equipment and thus, the workman's job was rendered more complicated.

A very important object of the invention, therefore, is the provision of a universal beef-handling apparatus wherein hindquarters and forequarters may be alternately handled thereby to the end that the operational flexibility of the apparatus is substantially improved over the meat-handling machines which have been utilized in the past.

In this connection, it is an aim of the invention to provide a pair of hooks, one of which is adapted for handling hindquarters while the other is adapted for handling forequarters, and wherein the hooks are each individually reciprocable between a meat-handling position and a retracted position in clearing relationship with respect to the meat-handling position of the other hook.

Another very important object of the invention is the provision of such meat-handling apparatus including an elongated actuator for each hook whereby the latter extends forwardly from the apparatus and yet may be manipulated into a meat-hooking position by a workman standing at the rear of the apparatus.

An extremely important object of the invention is to provide a meat-handling hook which is manipulable in two different directions relative to the apparatus so that the hook may be positively forced into hooking relationship with respect to a meat carcass and at an exact location on the latter.

In connection with the above object, it is an aim of the invention to provide mechanism for manipulating the hook in two directions which may be operated by one hand of a workman so that his other hand is free to swing the carcass on its conventional support to further aling the carcass with the hook if necessary.

Other objects, purposes and aims of the invention will become clear in the following specification and accompanying drawing, wherein.

Figure 1:
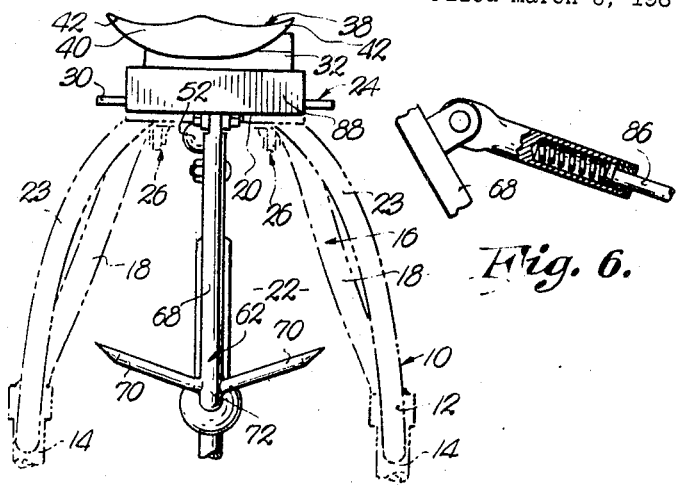
FIGURE 1 is a fragmentary, front elevational view of meat-handling apparatus embodying the principles and concepts of the instant invention.
Figures 5, 6:
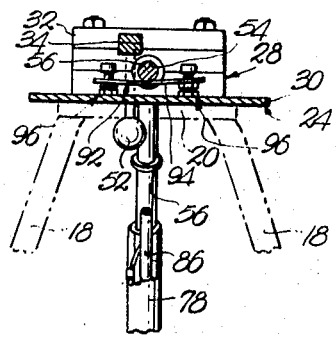
FIG. 5 is a cross-sectional view taken along line 5—5 of FIG. 3.
FIGS. 6 and 7 are enlarged, fragmentary views, partially in cross section, illustrating details of construction.
Figure 2:
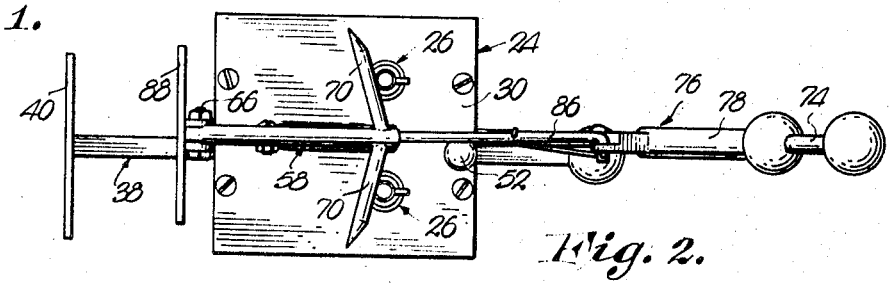
FIG. 2 is a bottom plan view thereof.

A meat-handling apparatus embodying the principles and concepts of the instant invention is broadly designated by the numeral 10 and includes a mobile frame in the nature of a hand truck 12 of the type illustrated in my above-referenced and specifically incorporated patent. As disclosed in the above-referenced patent, the hand truck 12 includes a pair of spaced, parallel, upright piston and cylinder assemblies 14 and a substantially V-shaped elevator 16 having a leg 18 for each assembly 14 and a bight 29 interconnecting the legs 18 to present an open space 22 providing room for manipulation of tools and the like. Elevator 16 has a pair of spaced braces 23 extending between the lower margins of respective legs 18 and bight 20 to provide additional support for the latter. A meat-handling head 24 is mounted on bight 20 and may be releasably connected thereto by fasteners such as bolt and wing nut means 26.

Head 24 includes a bracket 28 having a plate 30 which mounts structure in the nature of spaced pillow blocks 32 at opposite ends thereof. Each block 32 has guide means in the nature of a rectangular opening 34 therein slidably receiving the transversely rectangular, elongated actuator element 36 of a first hook means 38 therethrough. A substantially crescent-shaped hook member 40 having opposed, upwardly and outwardly directed pointed portions 42 is mounted on one end of element 36, the latter having a handle portion 44 at the other end thereof. A lock means 46 includes an element 48 which is yieldably biased toward element 36 in a position for engagement with spaced indentations 50 to releasably maintain hook means 38 in an operational position indicated by the solid lines in FIG. 3, or in a retracted position as indicated by the dashed lines in FIG. 3. Lock means 46 also includes a knob 52 coupled with element 48 for moving the latter out of engagement with indentations 50 to permit reciprocation of hook means 38 along the path of travel defined by openings 34.

Each block 32 is also provided with bearing means presenting aligned, circular apertures 54 pivotally mounting the elongated actuator element 56 of a second hook means 58. Element 56 is provided with spaced shoulders 60 engaging blocks 32 for holding element 56 against longitudinal displacement. A hook member 62 is swingably mounted on a head 64 at one end of element 56 by pivot means 66 for swinging about an axis which is lateral with respect to the axis of rotation of element 56 within apertures 54.

Hook member 62 includes a shank 68 depending from head 64 and a pair of opposed tines 70 extending laterally from the lowermost end portion 72 of shank 68 in a direction substantially parallel to the direction of swinging of the same during rotation of element 56 within apertures 54. Element 56 is provided with a handle portion 74 disposed for rotating element 56 within apertures 54 and thereby swinging hook means 58 about the longitudinal axis of element 56.

Hook means 58 is provided with means 76 for swinging hook member 62 about the axis of pivot means 66. Means 76 includes a slide mechanism in the nature of a sleeve 78 reciprocable along handle portion 74 in surrounding relationship with respect to the latter. A lateral extension 80 on sleeve 78 houses lock means including a spring biased ball element 82 which is disposed for engagement with corresponding indentations 84 in handle portion 74 for releasably maintaining sleeve 78 in the position indicated by the solid lines or in the position indicated by the dashed lines in FIG. 3. A linkage 86 has one end thereof pivotally connected to shank 68, while the other end thereof is pivotally connected to extension 80. A horizontally extending bumper bar 88 is rigid with head 64 and extends laterally therefrom on opposite sides thereof in spaced relationship with respect to hook member 40 when the latter is in its operational position.

Hook means 38 is utilized for handling beef hind-quarters. The member 40 is moved to its operational position by exerting a downward pull on knob 52 and then pushing on handle portion 44 to move element 36 through openings 34 until hook means 38 assumes the position thereof indicated in the solid lines of FIG. 3. Either of the pointed portions 42, depending on the position of the beef hindquarter with respect to apparatus 10, may be utilized for insertion into the conventional slit or gam hole of the hindquarter and into hooking relationship with respect to the tendon therein. After one of the pointed portions 42 of member 40 is in hooking engagement with respect to the beef hindquarter, assemblies 14 are actuated to raise elevator 16 and thereby lift the beef hindquarter off of its storage hook and render the same transportable by the structure 12. The bumper bar 88 is disposed to engage the leg of the hindquarter and hold the same in a position for insertion of the pointed portion 42 into hooking engagement with the tendon.

Figures 3, 7:
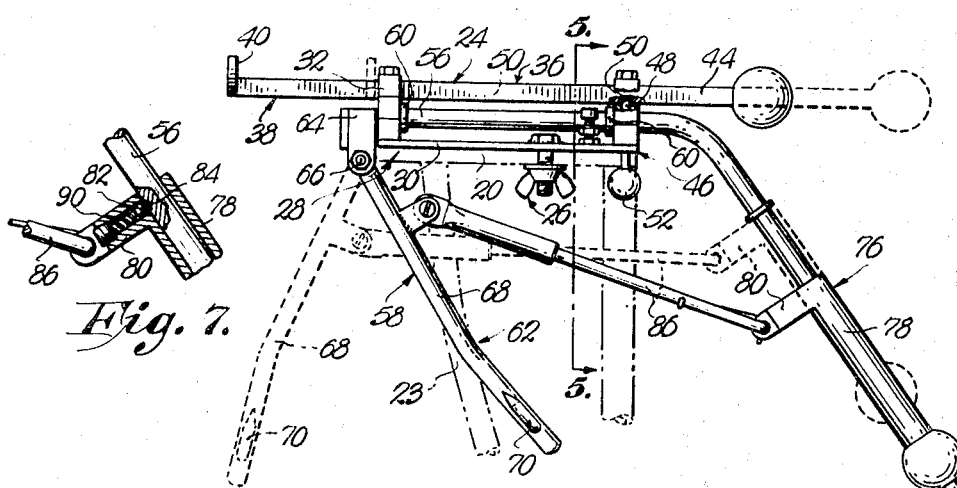
FIG. 3 is a side elevational view thereof.
Figure 4:
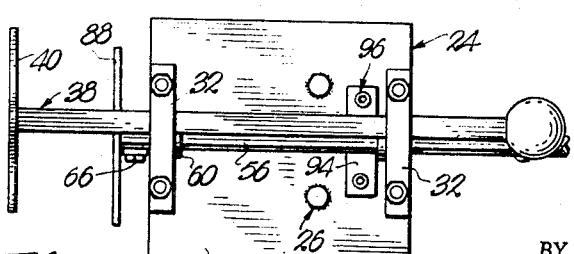
FIG. 4 is a fragmentary, top plan view thereof.

For handling beef hindquarters, hook means 38 is retracted by pulling downwardly on knob 52 and pulling rearwardly on handle 44 until hook means 38 assumes the position indicated by the dashed lines of FIG. 3. Upon releasing knob 52, element 48 will be biased upwardly into an appropriate indentation 50 for releasably maintaining hook member 40 in its retracted position. Sleeve 78 is shifted longitudinally of portion 74 from the solid line position thereof and into the dashed line position of the same. The ball-shaped element 82 cooperates with the indentations 84 to releasably maintain the sleeve 78 in either position; however, the rounded surfaces of the element 82 and the indentation 84 permit movement of the sleeve 78 so long as a sufficient force is exerted thereon to overcome the bias of a spring 90 which forces the element 82 into the indentation 84.

During movement of sleeve 78 from its solid line position to its dashed line position, hook member 62 is swung about the axis of pivot means 66 from its retracted solid line position to its operational dashed line position. When hook member 62 is in its operational, dashed line position and hook member 40 is in its retracted, dashed line position, hook member 62 may be swung laterally about the longitudinal axis of element 56 by swinging handle portion 74.

A frictional brake 92 is provided for holding hook means 58 in position after the hook member 62 has been swung laterally. Brake 92 includes a metal strip 94 which engages element 56 and a pair of adjustable nut and bolt assemblies 96 for forcing strip 94 against element 56. Manifestly, strip 94 exerts sufficient pressure on element 56 to hold the latter against rotation in response to gravitational forces on hook member 62 while permitting swinging of the latter upon application of slight hand pressure to handle 74. Hook member 62 may be swung in two substantially perpendicular directions so that either of the tines 70 (depending on the disposition of apparatus 10 with respect to the meat carcass to be handled) may be hookingly engaged with the ribs of a beef forequarter at an exact location to permit lifting of the forequarter without substantially damaging the same. Furthermore, sufficient manipulation of hook member 62 is permitted so that the tines 70 may be forced into firm hooking engagement with the forequarter prior to operation of assemblies 14 to cause elevator 16 to move upwardly and lift the forequarter from its support.

The hook means 38 and 58 permit handling of either hindquarters or forequarters with the same apparatus. This is particularly facilitated by the fact that each of the hook means 38, 58 is individually retractable into a position in clearing relationship with respect to the field of operation of the other hook means.

Having thus described the invention, what is claimed as new and desired to be secured by Letters Patent is:

1. A meat handling apparatus comprising:
a mobile frame including an elevator;
a bracket mounted on said elevator for vertical movement therewith;
hook means shiftable longitudinally with respect to said bracket into a position for hooking engagement with at least a portion of a meat carcass whereby upon upward movement of said elevator, said portion of the carcass is lifted and rendered transportable by the frame; and
means depending said hook means from said bracket for lateral, reciprocal swinging movement in a plane generally perpendicular to the longitudinal axis of said bracket.

2. A meat handling apparatus comprising:
a mobile frame including an elevator;
a bracket mounted on said elevator for vertical movement therewith;
hook means shiftable on said bracket into a position for hooking engagement with at least a portion of a meat carcass whereby, upon upward movement of said elevator, said portion of the carcass is lifted and rendered transportable by the frame; and
lock means operably associated with said hook means for releasably maintaining the latter in any one of a number of preselected positions, said lock means including means defining an indentation on said hook means and an element yieldably biased into said indentation.

3. A meat handling apparatus comprising:
  a mobile frame including an elevator;
  a bracket mounted on said elevator for vertical movement therewith;
  hook means shiftable on said bracket into a position for hooking engagement with at least a portion of a meat carcass whereby, upon upward movement of said elevator, said portion of the carcass is lifted and rendered transportable by the frame, said hook means including an elongated actuator element and a hook member at one end of said element, the latter having a handle portion at the opposite end thereof for shifting said member, said element extending across said bracket in a direction substantially longitudinally of the normal direction of movement of said frame; and
  structure mounting said element on said bracket for reciprocable movement, said structure including guide means mounting said element for longitudinal, rectilinear reciprocation, said hook member extending horizontally and laterally from said one end of the element, the hook member being substantially crescent-shaped presenting a pair of opposed, spaced, upwardly and outwardly directed pointed portions.

4. A meat handling apparatus comprising:
  a mobile frame including an elevator;
  a bracket mounted on said elevator for vertical movement therewith;
  hook means shiftable on said bracket into a position for hooking engagement with at least a portion of a meat carcass whereby, upon upward movement of said elevator, said portion of the carcass is lifted and rendered transportable by the frame, said hook means including an elongated actuator element and a hook member at one end of said element, the latter having a handle portion at the opposite end thereof for shifting said member; and
  structure mounting said element on said bracket for reciprocal movement, said element extending across said bracket in a direction substantially longitudinally of the normal direction of movement of said frame;
  said hook member including a shank depending from said one end of the element and a tine extending laterally from the normally lowermost end portion of said shank.

5. Apparatus as set forth in claim 4, wherein said structure includes bearing means mounting said element for axial, rotative oscillation for reciprocably swinging said shank and tine about the longitudinal axis of said element.

6. Apparatus as set forth in claim 5, wherein said tine extends from said shank in parallelism with said direction of swinging.

7. Apparatus as set forth in claim 5, wherein is included means pivotally mounting said shank on said element for swinging movement about an axis disposed laterally of said longitudinal axis.

8. Apparatus as set forth in claim 7, wherein is included means coupled with said shank for swinging the latter about said laterally disposed axis.

9. Apparatus as set forth in claim 8, wherein said means coupled with said shank includes a slide mechanism on said handle portion and linkage coupling said mechanism and said shank for swinging the latter about said laterally disposed axis in response to sliding of said mechanism.

10. Meat-handling apparatus comprising:
  a mobile frame including an elevator;
  a bracket mounted on said elevator for vertical movement therewith;
  first hook means shiftable on said bracket into a position for hooking engagement adjacent the ribs of a beef hindquarter;
  second hook means shiftable on said bracket into a position for hooking engagement with the tendon adjacent the knee of a beef forequarter;
  each of said hook means being reciprocable between operational positions and retracted positions in clearing relationship to the operational position of the other hook means;
  said first hook means being longitudinally reciprocable in a rectilinear path between said operational position and said retracted position, said second hook means being swingably reciprocable in one plane for movement between said operational position and said retracted position and swingably shiftable in another plane for hooking engagement with said forequarter.

References Cited

UNITED STATES PATENTS

| | | | |
|---|---|---|---|
| 679,279 | 7/1901 | Fairchild | 214—383 |
| 1,174,786 | 3/1916 | Wieland | 294—79 |
| 2,375,104 | 5/1945 | Heitshu | 187—9 XR |
| 2,779,494 | 1/1957 | Kikuchi | 214—650 |
| 2,906,420 | 9/1959 | Garcia | 214—383 XR |
| 3,175,719 | 3/1965 | Herndon | 214—651 XR |
| 3,141,564 | 7/1964 | Reich | 214—512 XR |
| 3,285,443 | 11/1966 | Gaumont | 294—82 XR |

ALBERT J. MAKAY, *Primary Examiner.*

U.S. Cl. X.R.

214—512